(12) United States Patent
Yoshida et al.

(10) Patent No.: US 11,879,104 B2
(45) Date of Patent: Jan. 23, 2024

(54) HYDROCARBON RECOVERY FACILITY

(71) Applicant: MITSUBISHI HEAVY INDUSTRIES, LTD., Tokyo (JP)

(72) Inventors: Kaori Yoshida, Tokyo (JP); Rikio Kan, Hiroshima (JP); Seiji Kakesako, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 799 days.

(21) Appl. No.: 16/976,260

(22) PCT Filed: Feb. 22, 2019

(86) PCT No.: PCT/JP2019/006808
§ 371 (c)(1),
(2) Date: Aug. 27, 2020

(87) PCT Pub. No.: WO2019/167834
PCT Pub. Date: Sep. 6, 2019

(65) Prior Publication Data
US 2021/0047574 A1    Feb. 18, 2021

(30) Foreign Application Priority Data

Mar. 1, 2018  (JP) ................. 2018-036506

(51) Int. Cl.
*C10J 3/48* (2006.01)
*B01D 35/28* (2006.01)
(Continued)

(52) U.S. Cl.
CPC ............... *C10J 3/48* (2013.01); *B01D 35/28* (2013.01); *C10G 33/00* (2013.01); *C10K 1/101* (2013.01);
(Continued)

(58) Field of Classification Search
CPC .................. C10J 3/48; C10J 2300/093; C10J 2300/1618; C10J 3/00; B01D 35/28;
(Continued)

(56) References Cited

U.S. PATENT DOCUMENTS 3,917,569 A    11/1975   Richter et al.
4,099,932 A     7/1978   Child
(Continued)

FOREIGN PATENT DOCUMENTS

JP    S49-101289 A    9/1974
JP    2002-530473 A   9/2002
(Continued)

OTHER PUBLICATIONS

American Petroleum Institute Consortium (Year: 2010).*
(Continued)

*Primary Examiner* — Randy Boyer
*Assistant Examiner* — Juan C Valencia
(74) *Attorney, Agent, or Firm* — Osha Bergman Watanabe & Burton LLP

(57) ABSTRACT

A hydrocarbon recovery facility includes: a washing column configured to bring a gas and water into contact to deposit a hydrocarbon contained in the gas into the water; an automatic strainer for continuously removing the hydrocarbon together with part of the water from the water mixed with the hydrocarbon; an oil-water mixing drum for mixing the water and the hydrocarbon removed by the automatic strainer with an organic solvent to prepare an oil-water mixture; and an oil-water separation drum for separating the oil-water mixture prepared in the oil-water mixing drum into an oil phase and a water phase.

5 Claims, 2 Drawing Sheets

(51) Int. Cl.
*C10G 33/00* (2006.01)
*C10K 1/10* (2006.01)

(52) U.S. Cl.
CPC .. *C10J 2300/093* (2013.01); *C10J 2300/1618* (2013.01)

(58) Field of Classification Search
CPC .......... C10G 33/00; C10G 5/04; C10G 33/06; C10K 1/101; C10K 1/10; C02F 2101/32; C02F 2103/18; C02F 1/26; Y02E 20/16; Y02E 20/18
See application file for complete search history.

(56) References Cited

U.S. PATENT DOCUMENTS

| | | | |
|---|---|---|---|
| 4,205,962 A * | 6/1980 | Marion | C10J 3/74 48/212 |
| 6,623,537 B1 | 9/2003 | Jahnke | |
| 6,635,094 B1 | 10/2003 | Jahnke | |

FOREIGN PATENT DOCUMENTS

| | | | |
|---|---|---|---|
| JP | 2005-230734 A | | 9/2005 |
| JP | 2005230734 | * | 9/2005 |
| JP | 4107869 B2 | | 6/2008 |

OTHER PUBLICATIONS

The extended European Search Report dated Mar. 4, 2021, issued to the corresponding EP Application No. 19761285.6 (6 pages).
International Search Report issued in corresponding International Application No. PCT/JP2019/006808, dated May 21, 2019 (9 pages).
International Preliminary Report on Patentability issued in corresponding International Application No. PCT/JP2019/006808, dated Sep. 10, 2020 (15 pages).

* cited by examiner

HYDROCARBON RECOVERY FACILITY

TECHNICAL FIELD

The present disclosure relates to a hydrocarbon recovery facility.

BACKGROUND

Patent Document 1 describes that, in order to treat hydrocarbons contained in syngas produced by gasification of coal, the hydrocarbons are deposited in a washing column, and the deposited hydrocarbons are removed by a strainer. Since the hydrocarbons removed by the strainer are solid having a size of about 5 mm to egg size, it is pulverized, then dissolved in an organic solvent, and burned in a gasification furnace or an off-gas combustion furnace.

CITATION LIST

Patent Literature

Patent Document 1: JP4107869B

SUMMARY

Problems to be Solved

However, the system of Patent Document 1 needs a facility for pulverizing solid hydrocarbons, so that the hydrocarbon treatment facility is costly. In addition to this problem, solid hydrocarbons are difficult to handle.

In view of the above, an object of at least one embodiment of the present disclosure is to provide a hydrocarbon recovery facility that can continuously recover hydrocarbons in a gas at low cost.

Solution to the Problems

A hydrocarbon recovery facility according to at least one embodiment of the present invention comprises: a washing column configured to bring a gas and water into contact to deposit a hydrocarbon contained in the gas into the water; an automatic strainer for continuously removing the hydrocarbon together with part of the water from the water mixed with the hydrocarbon; an oil-water mixing drum for mixing the water and the hydrocarbon removed by the automatic strainer with an organic solvent to prepare an oil-water mixture; and an oil-water separation drum for separating the oil-water mixture prepared in the oil-water mixing drum into an oil phase and a water phase.

With this configuration, water containing hydrocarbons is continuously removed by the automatic strainer, and the removed water and hydrocarbons are separated into the oil phase containing the hydrocarbons and the water phase by the oil-water mixing drum and the oil-water separation drum, so that the hydrocarbons in the gas can be continuously recovered at low cost.

In some embodiments, the oil-water mixing drum may include an agitator. With this configuration, the agitator in the oil-water mixing drum stirs contents in the oil-water mixing drum to promote the dissolving of hydrocarbons into the organic solvent, so that the hydrocarbons can be recovered efficiently.

In some embodiments, the organic solvent may be flammable. In this case, the organic solvent may be kerosene, light oil, anthracene oil, or creosote oil. With this configuration, since the organic solvent supplied to the oil-water separation drum is flammable, the organic solvent dissolving the hydrocarbons can be used as fuel.

In some embodiments, the gas may be syngas obtained by gasification of coal. With this configuration, in the integrated coal gasification combined cycle power plant, it is possible to continuously recover hydrocarbons in syngas at low cost.

Advantageous Effects

According to at least one embodiment of the present disclosure, water containing hydrocarbons is continuously removed by the automatic strainer, and the removed water and hydrocarbons are separated into the oil phase containing the hydrocarbons and the water phase by the oil-water mixing drum and the oil-water separation drum, so that the hydrocarbons in the gas can be continuously recovered at low cost.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

First Embodiment

Figure 1:
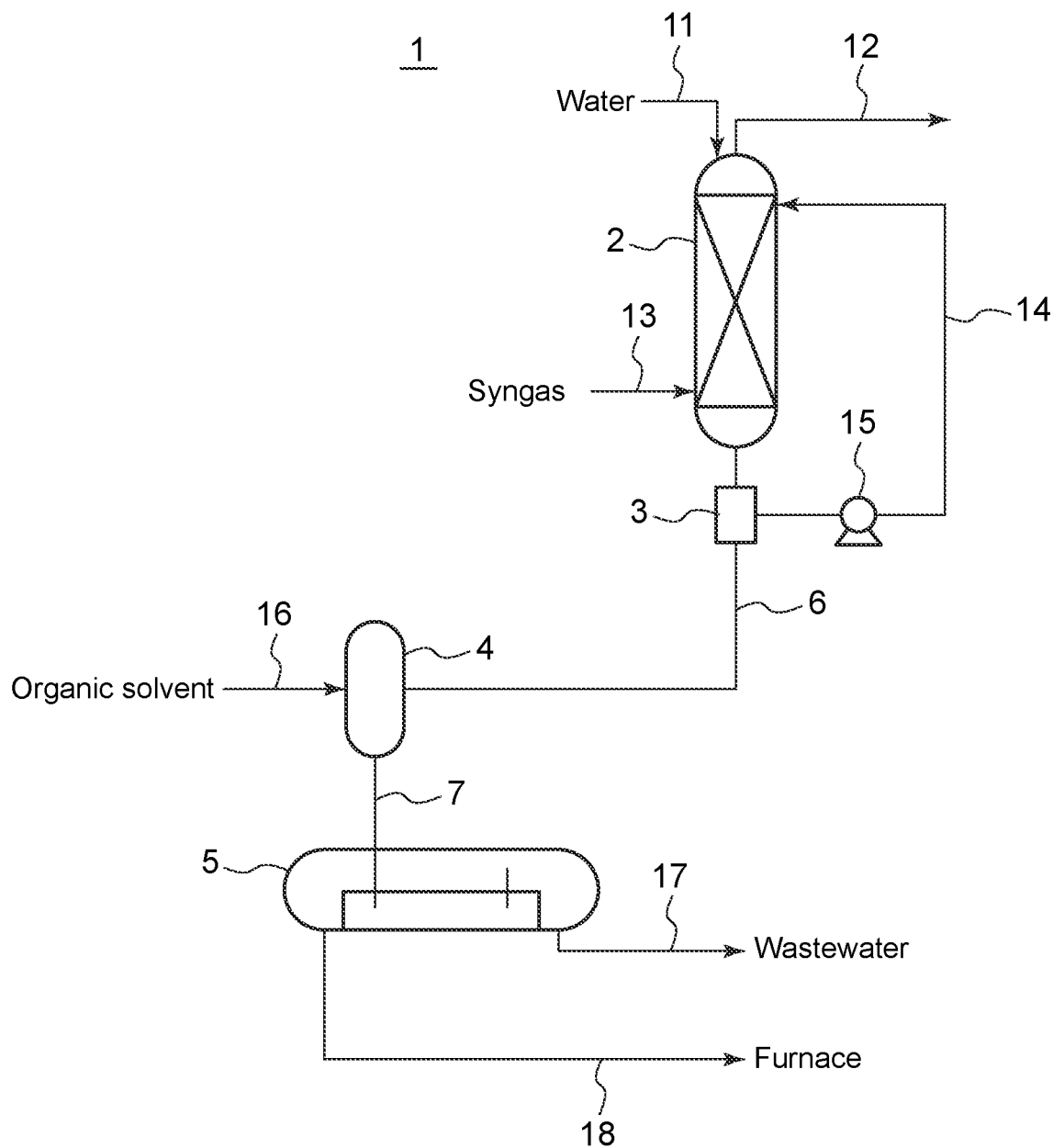
FIG. 1 is a schematic configuration diagram of a hydrocarbon recovery facility according to a first embodiment of the present disclosure.

FIG. 1 shows a hydrocarbon recovery facility 1 according to a first embodiment of the present disclosure. The hydrocarbon recovery facility 1 includes a washing column 2 for cooling syngas obtained by gasification of coal in an integrated coal gasification combined cycle power plant, an automatic strainer 3 disposed on a pipe 6 communicating with the tower bottom of the washing column 2, an oil-water mixing drum 4 communicating with the automatic strainer 3 via the pipe 6, and an oil-water separation drum 5 communicating with the oil-water mixing drum 4 via a pipe 7.

The washing column 2 is provided with a supply pipe 13 for supplying syngas to the washing column 2, a feedwater pipe 11 for supplying water to the washing column 2 from the tower top, a discharge pipe 12 for discharging syngas that has been cooled in the washing column 2 from the tower top, and a circulation pipe 14 for circulating water to the washing column 2. The circulation pipe 14 communicates at one end with the automatic strainer 3 and at the other end with the washing column 2. The circulation pipe 14 is provided with a pump 15 for circulating water.

The automatic strainer 3 may be, for example, an automatic strainer of scraping type. The automatic strainer of scraping type is an automatic strainer configured to scrape substances collected on a fixed element with a brush scraper to accumulate the substances on the bottom, and remove them to the outside. However, the automatic strainer 3 is not limited to this configuration, and an automatic strainer having any configuration can be used. As the automatic strainer of scraping type, for example, DNA-B manufactured by Daido Machines Co., Ltd., can be used.

The oil-water mixing drum 4 is provided with a supply pipe 16 for supplying an organic solvent. The organic solvent needs to be an organic solvent having as large specific gravity difference from water as possible in order to separate the oil phase from the water phase in the oil-water separation drum 5. Further, the organic solvent is preferably flammable. Illustrative examples of the organic solvent to be used include, but not limited to, kerosene, light oil, anthracene oil, and creosote oil. Any organic solvent at least having a specific gravity difference from water can be used.

The oil-water separation drum 5 separates the oil phase from the water phase by the specific gravity difference. Any separator can be used as long as it can perform such separation. The oil-water separation drum 5 is provided with a wastewater pipe 17 communicating with a wastewater treatment facility, and an oil pipe 18 communicating with a combustion furnace. In the case where the organic solvent supplied to the oil-water mixing drum 4 is non-flammable, the oil pipe 18 is connected to a waste oil facility for treating the oil phase separated in the oil-water separation drum 5.

Next, operation of the hydrocarbon recovery facility 1 according to the first embodiment will be described.

When syngas supplied to the washing column 2 via the supply pipe 13 lifts inside the washing column 2, the syngas comes into contact with water supplied to the washing column 2 from the tower top via the feedwater pipe 11 and water from the circulation pipe 14, so that the syngas is cooled. The cooled syngas is discharged from the tower top of the washing column 2 and flows through the discharge pipe 12 into downstream equipment.

On the other hand, when syngas and water come into contact with each other in the washing column 2 to cool the syngas, hydrocarbons contained in the syngas are deposited in the water, so that the hydrocarbons are mixed into the water that has cooled syngas. This water is discharged from the tower bottom of the washing column 2 and flows through the pipe 6 into the automatic strainer 3. The automatic strainer 3 continuously removes hydrocarbons together with part of water from the water mixed with the hydrocarbons. The water from which hydrocarbons have been removed is returned to the washing column 2 through the circulation pipe 14 by the pump 15.

The water and hydrocarbons discharged from the automatic strainer 3 flows through the pipe 6 into the oil-water mixing drum 4. The oil-water mixing drum 4 is also supplied with an organic solvent via the supply pipe 16. In the oil-water mixing drum 4, hydrocarbons mixed in water is dissolved in the organic solvent to produce an oil-water mixture containing the water phase and the oil phase in which the hydrocarbons are dissolved.

The oil-water mixture is discharged from the oil-water mixing drum 4 and flows through the pipe 7 into the oil-water separation drum 5. The oil-water mixture is left to stand in the oil-water separation drum 5 to separate the oil phase from the water phase by the specific gravity difference. The separated water phase is discharged from the oil-water separation drum 5 via the wastewater pipe 17, while the separated oil phase is discharged from the oil-water separation drum 5 via the oil pipe 18. In the case where the organic solvent is flammable, the oil phase is supplied to a combustion furnace through the oil pipe 18, and is used as fuel in the combustion furnace.

In this way, water containing hydrocarbons is continuously removed by the automatic strainer 3, and the removed water and hydrocarbons are separated into the oil phase containing the hydrocarbons and the water phase by the oil-water mixing drum 4 and the oil-water separation drum 5, so that the hydrocarbons in the gas can be continuously recovered at low cost.

Second Embodiment

Next, a hydrocarbon recovery facility according to a second embodiment will be described. The hydrocarbon recovery facility according to the second embodiment additionally includes a configuration for promoting the production of the oil-water mixture in the oil-water mixing drum 4 compared with the first embodiment. In the second embodiment, the same constituent elements as those in the first embodiment are associated with the same reference numerals and not described again in detail.

Figure 2:
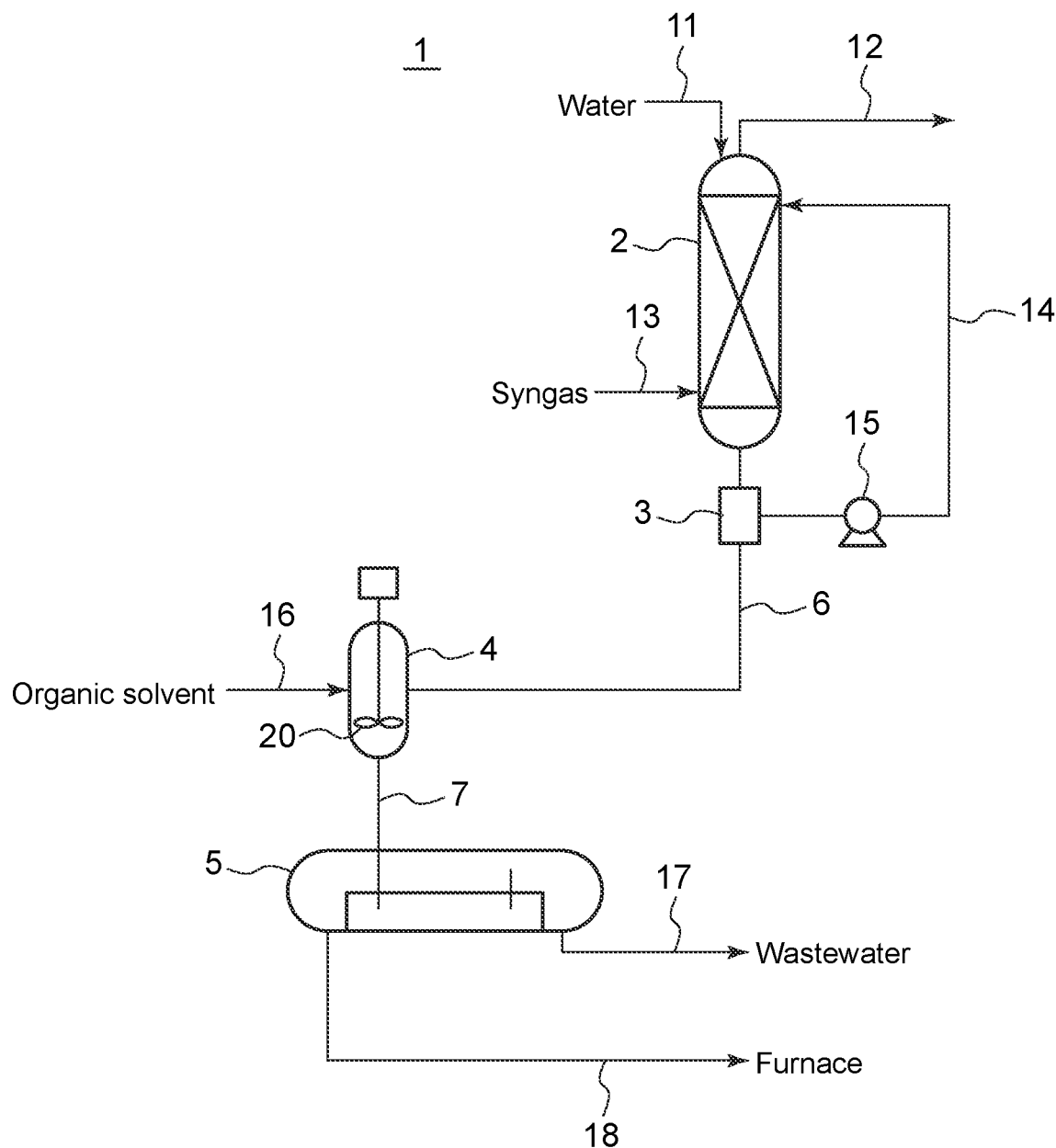
FIG. 2 is a schematic configuration diagram of a hydrocarbon recovery facility according to a second embodiment of the present disclosure.

As shown in FIG. 2, the oil-water mixing drum 4 is provided with an agitator 20 for stirring inside. The agitator 20 may be, for example, an impeller of any shape. The configuration is otherwise the same as that of the first embodiment.

The operation of the hydrocarbon recovery facility 1 according to the second embodiment is basically the same as that described in the first embodiment. In the second embodiment, the agitator 20 in the oil-water mixing drum 4 stirs contents in the oil-water mixing drum 4 to promote the dissolving of hydrocarbons into the organic solvent, so that the hydrocarbons can be recovered efficiently.

Although in the first and second embodiments, the washing column 2 is a facility of an integrated coal gasification combined cycle power plant, and the gas fed to the washing column 2 is syngas obtained by gasification of coal, embodiments are not limited thereto. The hydrocarbon recovery facility of the present disclosure can be used in any facility to recover hydrocarbons mixed in water.

REFERENCE SIGNS LIST

1 Hydrocarbon recovery facility
2 Washing column
3 Automatic strainer
4 Oil-water mixing drum
5 Oil-water separation drum
6 Pipe
7 Pipe
11 Feedwater pipe
12 Discharge pipe
13 Supply pipe
14 Circulation pipe
15 Pump
20 Agitator

The invention claimed is:
1. A hydrocarbon recovery facility comprising:
a washing column configured to bring a gas and water into contact to deposit a hydrocarbon contained in the gas into the water;
an automatic strainer of scraping type that continuously removes the hydrocarbon together with part of the water from the water mixed with the hydrocarbon by scraping substances collected on a fixed element with a brush scraper to remove them to an outside;
an oil-water mixing drum for mixing the water and the hydrocarbon removed by the automatic strainer with an organic solvent to prepare an oil-water mixture; and an oil-water separation drum for separating the oil-water mixture prepared in the oil-water mixing drum into an oil phase and a water phase.

2. The hydrocarbon recovery facility according to claim 1, wherein the oil-water mixing drum includes an agitator.

3. The hydrocarbon recovery facility according to claim 1, wherein the organic solvent is flammable.

4. The hydrocarbon recovery facility according to claim 3, wherein the organic solvent is kerosene, light oil, anthracene oil, or creosote oil.

5. The hydrocarbon recovery facility according to claim 1, wherein the gas is syngas obtained by gasification of coal.

* * * * *